(12) United States Patent
Chang

(10) Patent No.: US 6,397,991 B1
(45) Date of Patent: Jun. 4, 2002

(54) COMMUNICATIONS CABLE COILING BOX STRUCTURE

(76) Inventor: Hsi-Fan Chang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/667,251

(22) Filed: Sep. 22, 2000

(51) Int. Cl.[7] .............................................. H02G 11/02
(52) U.S. Cl. ................................................... 191/12.4
(58) Field of Search ......................... 171/12 R, 12.2 R, 171/12.4

(56) References Cited

U.S. PATENT DOCUMENTS

| | | | | |
|---|---|---|---|---|
| 5,718,310 A | * | 2/1998 | Gallo | 191/12.2 R |
| 6,135,254 A | * | 10/2000 | Liao | 191/12.4 |
| 6,176,358 B1 | * | 1/2001 | Hsin | 191/12.2 R |
| 6,253,893 B1 | * | 7/2001 | Chi-Min | 191/12.4 |

* cited by examiner

Primary Examiner—S. Joseph Morano
Assistant Examiner—Robert J. McCarry, Jr.
(74) Attorney, Agent, or Firm—Troxell Law Office PLLC

(57) ABSTRACT

A communications cable coiling box, composed of a casing including a coiling disk, a communications cable, a flexible member, and a mechanical switch. The communications cable is folded and coiled into a lateral side of the coiling disk and an external ring and the coil disk is disposed behind an axle inside the casing, with the flexible member in the circular convex ring on the other side and coupled to the axle. The communications cable can be pulled from the openings on the lateral sides of the casing, and the flexible member and the mechanical switch control the rewinding of the coiling disk to roll up the cable. This structure allows the cable to be pulled out freely to an appropriate length for use, or attains a fast rolling of the cable by the movement of such mechanical switch and the flexible member.

1 Claim, 5 Drawing Sheets

COMMUNICATIONS CABLE COILING BOX STRUCTURE

BACKGROUND OF THE INVENTION

1. Field of the Invention

The present invention relates to a structural design of a communication cable coiling box, more particularly to innovative design of a cable coiling structure applicable for rolling up and storing electrical appliance cables, and facilitating the free pulling of the cable to an appropriate length for use, and quickly rolling the communication cable by the elastic rolling structure for storage.

2. Description of the Prior Art

Computer peripherals of the hardware equipments must be connected to the computer system or the power by cables, and a set of computer will come with a various hardware according to the requirements of the functions, however there are so many connecting cables, the cable of these computer peripherals will be disorderly. Most people at present tie up the cables by a cable tie after they are rolled up. When the computer needs to be removed or repaired, all of the cable ties must be taken off or removed first, and they have to be restored after the maintenance, otherwise the cables will be in a chaos which affects the artistic vision. In addition, the current computer communication is developing in very fast manner, the notebook computers have built-in modem for the user to connect them to the E-net, ISDN or RJ11 for network connection, facsimile transmission, and the like. The notebook does not have the cables and telephone lines used for connecting the modem, and this communication cable need to be carried by the user for logging on the network any time. Such cable of one meter in length has to be carefully coiled when not in use, and untied when it is in use; it is very inconvenient and not artistic in look, and it may even cause the damage, worn out, or breaking of the cable.

In view of the above description, the inventor of the present invention based on years of experience in the related industry conducted extensive research to enhance the cable coiling box herein which is hereby submitted for patent application.

SUMMARY OF THE INVENTION

Therefore, the primary objective of the present invention is to provide a design of a communication cable coiling box structure which is composed of an upper casing, a lower casing to form a casing and within the casing there are a coil disk, a communication cable, an elastic member, and a mechanical switch that composes the cable coiling box, and the communication cable is folded and coiled into a lateral side of the coiling disk and an external ring and the coil disk is deposed behind an axle inside the casing, and the flexible member is deposed in the circular convex ring on the other side and coupled to the axle. The communications cable can be pulled from the openings on the lateral sides. of the casing to the terminal section, and the flexible member and the mechanical switch control the coiling disk to roll up the cable. This structure allows the cable to be pulled out freely to an appropriate length for use, or attains a fast rolling of the cable by the movement of such mechanical switch and the flexible member.

Another objective of the present invention is to provide a communication cable coiling box structure, with an accommodating groove at a selected position on the casing for accommodating the terminals of the connecting signal lines.

To make it easier to understand the objective of the invention, its performance and advantages, we used a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
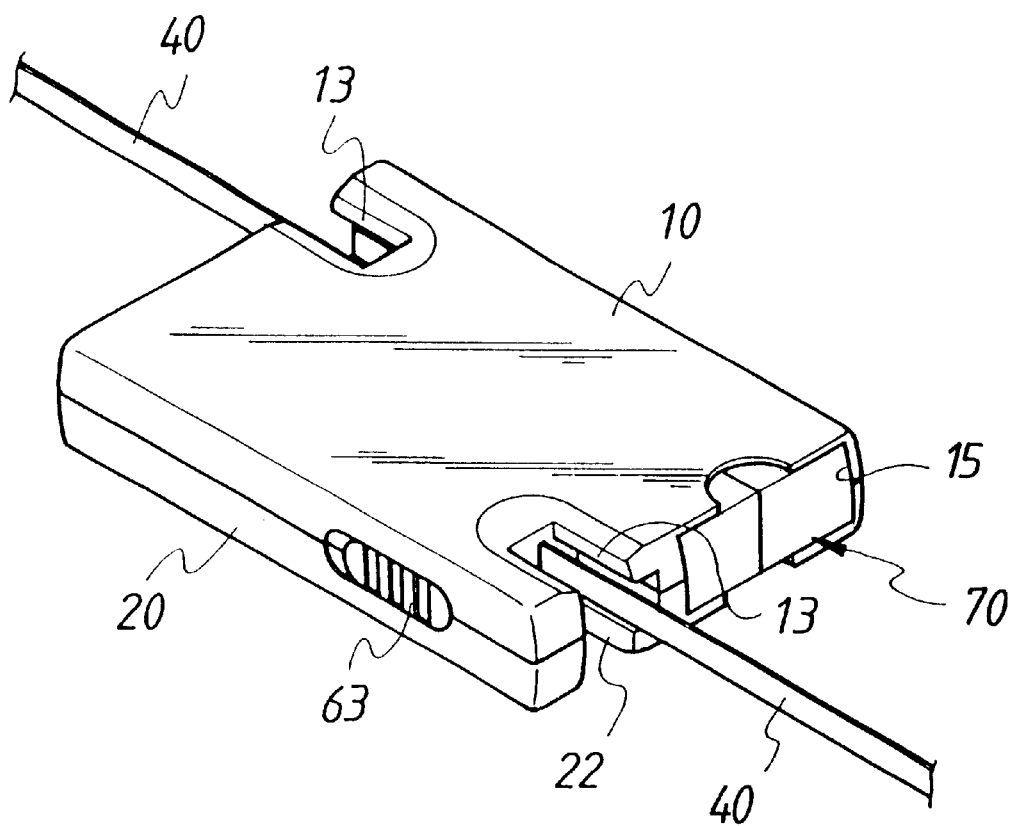
FIG. 1 shows the three-dimensional diagram of the communication cable coiling box according to the present invention.
Figure 2:
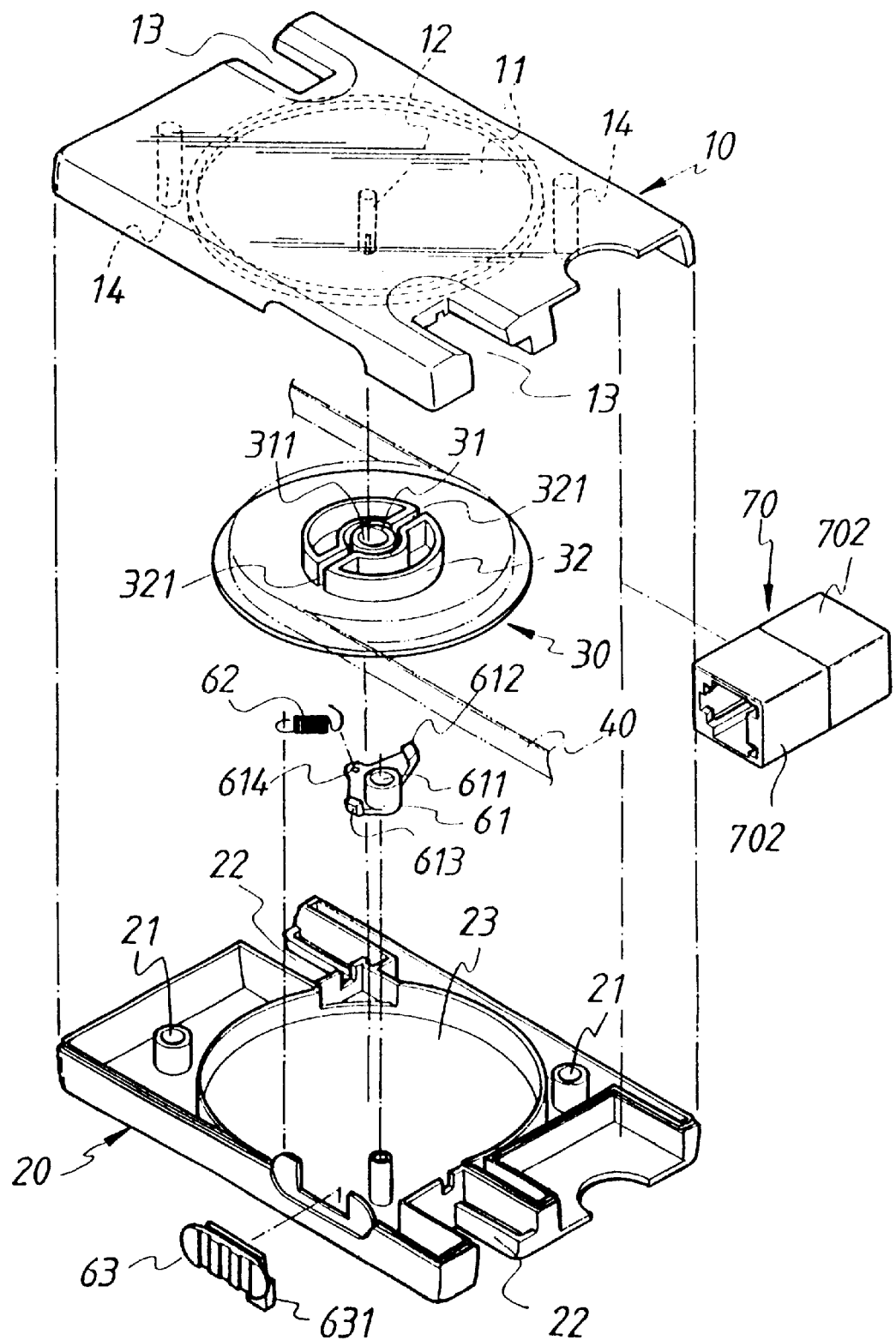
FIG. 2 shows the three-dimensional diagram of the disassembled parts of the present invention.

As shown in FIGS. 1 and 2, the design of the communication cable coiling box structure of the present invention comprises a casing having an upper casing 10 and a lower casing 20, and such casing further comprising a coiling disk 30, a communications cable 40, a flexible member 50, and a mechanical switch 60. An upper casing 10, has a coiling disk groove 11 and an axle 12 at the center of said upper casing 20 for mounting the coiling disk 30, and a terminal socket 13 each disposed on the front side and the back side of said upper casing 10, and a plurality of convex columns 14 are disposed on the internal lateral side of said upper casing 10.

A lower casing 20, is corresponsive to the upper casing 10 and has a coiling disk groove 23 disposed at its center, a plurality of inserting grooves 21 disposed in its internal lateral side corresponding to said convex columns 14, a terminal block 22 disposed on both lateral side corresponsive to said upper casing for accommodating the terminals 41 on both ends of the cable coil disk, and a coiling disk groove 23 disposed at the center of the lower casing for placing the coiling disk 30. After the foregoing convex columns 14 are inserted, the upper and lower casings will be combined as a whole.

Figure 3:
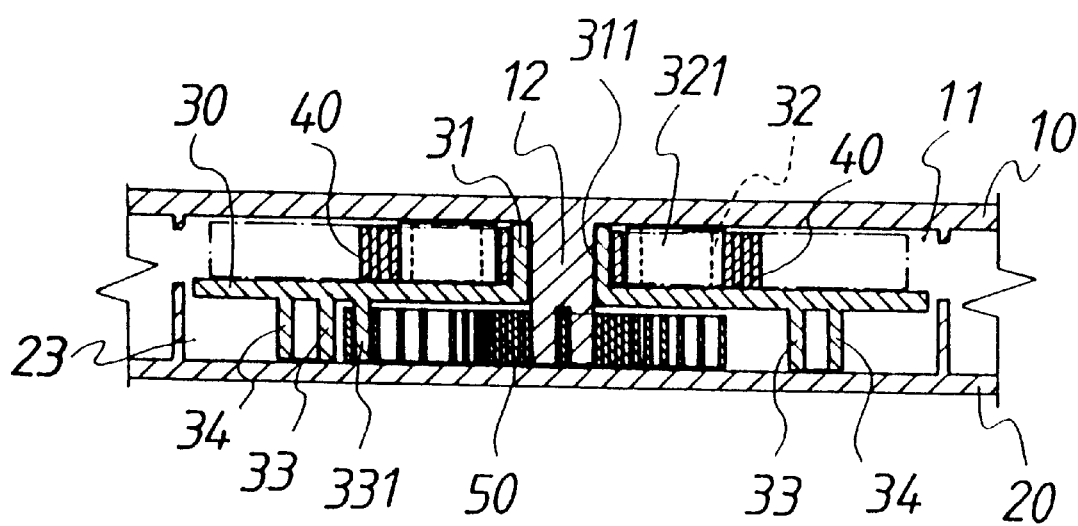
FIG. 3 shows the cross-section structure of the coiling disk of the present invention.
Figure 4:
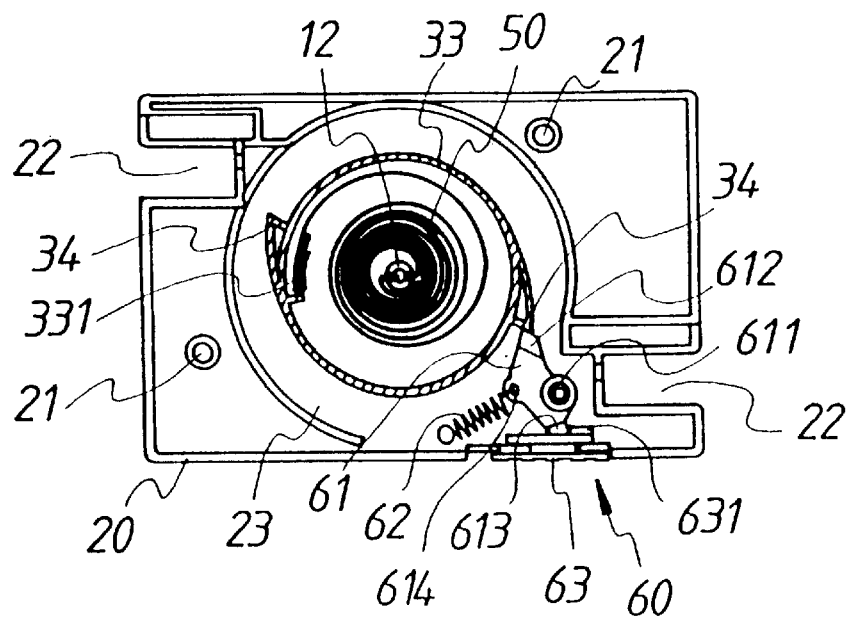
FIG. 4 shows the cross-sectional top view of the assembled structure of the present invention.

A coil disk 30, substantially in the shape of a circular disk, has protruding concentric internal ring 31 and external ring 32 at the center of the surface of said upper casing 10 as shown in FIG. 3, and said internal circular ring 31 has an axle hole 311 disposed at its center, and after coupling to the foregoing axle 12, it can rotate along the axis of the axle 12 and two cut openings 321 are disposed at the wall of the external ring 32 which is symmetrical to the external circular ring 32. A circular protruding ring 33 with a larger diameter protrudes above the center of the bottom surface of said coil disk 30, and a latch receiving bracket 331 is disposed at a selected place on the internal side of the convex circular ring 33. Two slant convex gears 34 in the selected circumference direction are disposed on the external wall of the convex ring 33 at bottom of the coil disk 30. A communications cable 40, has a terminal 41 at both of its ends, is inserted into the two cut openings 321 of the external circular ring 32 at the top surface of the coiling disk 30, by clipping the communication cable between the internal ring 31 and the external ring 32 and extending to the external lateral sides of the external circular ring 32. A flexible member 50, made by bending an elastic metal into a ring structure having a circular shape and surrounding the innermost circle has an end hooked to the foregoing axle 12 and a beginning end coiled around the external ring hooked to the latching bracket 331 so that the elastic member 50 restores the elasticity following the rewinding of the coiling disk. A mechanical switch 60 is composed of a bracket 61, a spring 62, and a latching member 63. The bracket 61 has a passing hole 61 at its center for being mounted to a selected position on the internal surface of the lower casing 20, a blocking section 612 and a pushing section 613 protruding outwards from lateral sides. The external lateral side of the bracket 61 has a hook hole 614 with a spring 62 having one of its ends hooked to the internal side of the lower casing 20, and the other end hooked to the hook hole 614. A latching member 63 is latched onto a lateral wall of the upper casing 10 and the lower casing 20, and has a convex protrusion 631 at one of the internal sides. As shown in FIG. 4, the convex protrusion 631 presses against the pushing section 613. The blocking section 612 by the action of the spring 62 presses the external wall of the convex ring 33 at the bottom of the coil disk 30.

When assembling the foregoing components, the communications cable 40 is folded and coiled in the internal ring 31 and the external ring 32 of the coiling disk 30, then the coiling disk axle is superimposed to the axle 12 into the coiling disk 30 and put into the coil disk groove 11. The elastic member 50 hooks into and positions in between the latch receiving bracket 331 and the axle 12, and the mechanical switch 60 is positioned. The terminals 41 on both ends of the communication cable 40 at that time will be disposed inside the terminal sockets 13, and finally the convex column 14 of the upper casing 10 and the inserting groove 21 of the lower casing 20 are coupled in position.

Figure 5:
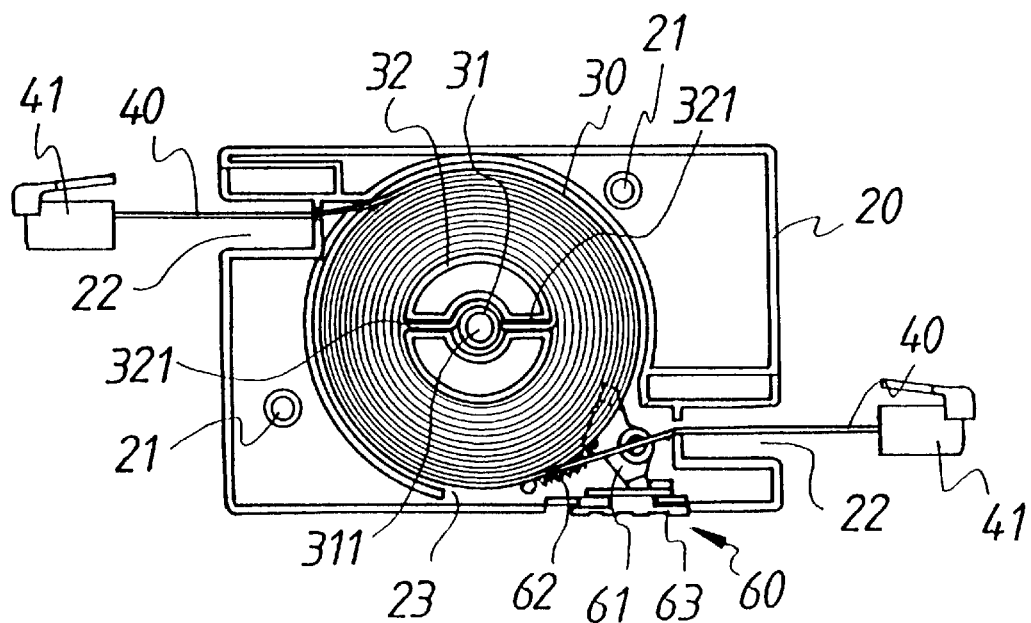
FIG. 5 shows another cross-sectional top view of the assembled structure of the present invention.

Furthermore, as shown in FIGS. 4 and 5, when this invention is applied for use, the terminals 41 on both lateral sides of the communication cable 40 are pulled outward making the communication cable 40 rotate the coiling disk 30. Meanwhile, elastic member 50 will also generate a coiling energy storage due to the rotation of coiling disk 30. As soon as the outward pulling force of the communication cable 40 diminishes, the coiling disk 30 will generate a rewind by the elastic member 50 and it makes the communication cable 40 to coil inward. At this time, the blocking section 612 of the bracket 61 blocks the slant protruding gear 34 at the bottom of the coiling disk 30. Hence, it keeps the communication cable 40 in an extension status. When the communication cable is desired to be rolled up, the latching bracket 63 of the mechanical switch 60 is pushed back and it moves the protrusion 631 enabling the bracket 61 to rotate and move the blocking section 612 away from the slant convex gear 34 to release it from the pressing status. The coiling disk 30 will rewind by the elastic member 50 and completely coil the communication cable 40.

Figure 6:
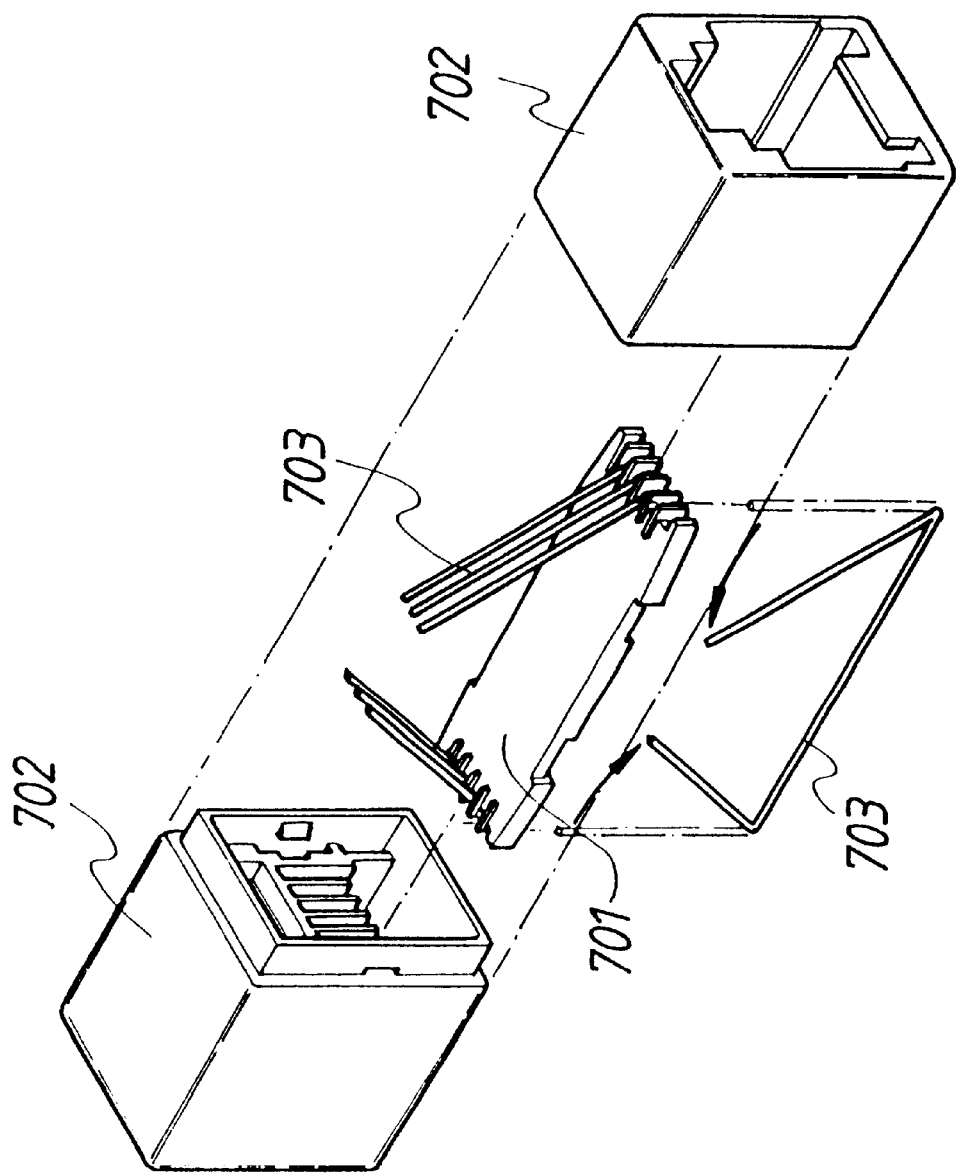
FIG. 6 shows the three-dimensional diagram of the disassembled connecting terminals according to the present invention.

Furthermore, an accommodating groove 15 is disposed on a lateral side of the casing for providing a connecting terminal 70 which is stored when not in use as shown in FIGS. 1 and 2. The connecting terminal 70 as shown in FIG. 6 is composed of an adapting socket 701 and two guiders 702. Such adapting socket 701 having a rectangular shape inlays a plurality of metallic wires 703 at the bottom of the adapting socket 701, and the metallic wires are bent upward and extend aslant to the lateral sides of the adapting socket 701. The guiders 702 are in the shape of rectangular cuboids which sleeve into both ends of the adapting socket 701 and combine the two guiders in a whole. Such arrangement provides a connection function by plugging the terminal 41 of the communication cable 40 into the guider 702.

While the invention has been described by way of example and in terms of a preferred embodiment, it is to be understood that the invention is not limited thereto. For example, the cable of a telephone, modem cable of a notebook computer, transmission line of a modem, etc. are all applicable for using the structure according to this invention. To the contrary, it is intended to cover various modifications and similar arrangements and procedures, and the scope of the appended claims therefore should be accorded the broadest interpretation so as to encompass all such modifications and similar arrangements and procedures.

What is claimed is:
1. A communications cable coiling box comprising:
 a) a casing including upper and lower casing portions, the casing having opposite end portions each having a terminal socket and one end having an accommodating groove therein;
 b) a coil disk rotatably located within the casing, the coil disk including concentric internal and external rings, the external ring having at least one convex gear extending outwardly therefrom;
 c) a communications cable wound around the coil disk and having two opposite cable ends extending from the opposite end portions of the casing, each opposite cable end having a terminal removably located in the terminal socket;
 d) a first spring acting between the casing and the coil disk to bias the coil disk toward a wound position in which the communications cable is wound on the coil disk and the terminals are each located in the terminal socket;
 e) a pivoting bracket pivotally attached to the casing and including a pushing section and a blocking section, the pivoting bracketing being movable between a first position in which the blocking section engages the at least one convex gear so as to prevent movement of the coil disk toward the wound position, and a second position in which the blocking section is disengaged from the at least one convex gear to enable movement of the coil disk toward the wound position;
 f) a second spring acting on the pivoting bracket to bias the pivoting bracket toward the first position;
 g) a latching member movably located on the casing so as to be movable from an exterior of the casing, the latching member having a protrusion engaging the pushing section of the pivoting bracket, whereby movement of the latching member causes the pivoting bracket to move between the first and second positions; and,
 h) at least one connecting terminal removably stored in the accommodating groove and attachable to the terminal of the communications cable.

* * * * *